(12) United States Patent
Sherry et al.

(10) Patent No.: US 6,188,937 B1
(45) Date of Patent: Feb. 13, 2001

(54) METHODS AND APPARATUS FOR ANNUNCIATION OF VEHICLE OPERATIONAL MODES

(75) Inventors: Lance C. Sherry; Daniel E. McCrobie, both of Scottsdale, AZ (US)

(73) Assignee: Honeywell International Inc., Morristown, NJ (US)

( * ) Notice: Under 35 U.S.C. 154(b), the term of this patent shall be extended for 0 days.

(21) Appl. No.: 09/163,859

(22) Filed: Sep. 30, 1998

(51) Int. Cl.$^7$ .............................. G06F 7/00; G06F 17/00
(52) U.S. Cl. .................................... 701/14; 701/3
(58) Field of Search ................... 701/14, 36, 3, 701/4, 15, 16

(56) References Cited

U.S. PATENT DOCUMENTS

| | | | |
|---|---|---|---|
| 5,359,890 | 11/1994 | Fulton et al. | 73/178 R |
| 5,412,382 | * 5/1995 | Leard et al. | 340/974 |
| 5,457,634 | * 10/1995 | Chakravarty | 701/3 |
| 5,523,949 | * 6/1996 | Agate et al. | 701/17 |
| 5,978,715 | * 11/1999 | Briffe et al. | 701/11 |

OTHER PUBLICATIONS

Michael Feary et al., "Aiding Vertical Guidance Understanding", HCI Aero 98 Conference, Montreal, May 27–29, 1998, pp. 1–7.

Lance Sherry and Peter G. Polson, "A New Conceptual Model for Avionics Annunciation", Technical Report of the Institute of Cognitive Science, University of Colorado, Aug. 1995, pp. 1–68.

Sanjay Vakil, "Development and Evaluation of a Prototype Electronic Vertical Situation Display", May 1996, pp. 3–110.

Asaf Degani et al., "Use of the Operator Function Model to Represent Mode Transitions", website address http://olias.arc.nasa.gov/publicatios/degani/OSUasaf/OSUasaf-.html, printed Feb. 1, 1999, 7 pages.

McCrobie, D.; Sherry L., "Vertical situation awareness and pilot performance", Digital Avionics Systems Conference, 1996., 15th AIAA/IEEE, pp. 499–504.*

Crowther, E.G.; Chappell, A.R.; Mitchell, C.M.; "VNAV Tutor: system knowledge training for improving pilot's mode awareness", Systems, Man, and Cybernetics, 1994. Humans, Information and Technology., 1994 IEEE International Conference, pp. 747–752, vol. 1.*

* cited by examiner

*Primary Examiner*—Michael J. Zanelli
*Assistant Examiner*—Eric M Gibson

(57) ABSTRACT

A vehicle control system contains a behavior annunciation function for generating a behavior mode output. The behavior mode annunciation system has a vehicle operational parameters database and a vehicle behavior mode database. In particular, the vehicle behavior annunciation system generates a behavior mode output by processing data from the vehicle operational parameters database and the vehicle behavior mode database to generate a behavior mode output. The behavior mode output is then communicated to the vehicle operator in a manner describing the general behavior of the vehicle.

19 Claims, 5 Drawing Sheets

METHODS AND APPARATUS FOR ANNUNCIATION OF VEHICLE OPERATIONAL MODES

This invention was made with the support of the United States government through contract NAS1-20219 of the National Aeronautics and Space Administration. The U.S. government has certain rights to the invention.

BACKGROUND OF THE INVENTION

1. Technical Field

The present invention relates generally to aircraft control, and more particularly, to methods and apparatus for displaying aircraft status.

2. Background Art and Technical Problems

Vehicle Control Systems (VCSs) have significantly improved safety, precision, and efficiency of travel. These improvements are due in part to the VCS automating tasks that were previously performed by the vehicle operator. However, while the VCS can provide efficient and optimal control, the vehicle operator is preferably provided with accurate and timely information to monitor vehicle behavior and direct overall vehicle operations. As the accuracy and frequency of information provided to the operator is improved, the operator is better able to make informed decisions, resulting in improved vehicle performance.

One example of a VCS is an aircraft Flight Control System (FCS). A FCS may complete all major tasks associated with flying an aircraft from origin to destination, including flight planning, guidance, control, and navigation. This reduces flight crew workload, improves mission safety, and increases the economy of aircraft operation. However, while these advantages are provided by the FCS, various operational and training issues have been raised, including, but not limited to: discrepancies between a pilot's understanding of the avionics design and actual operation; over-emphasis on the training of required operating procedures and under-emphasis on presenting a model of the actual organization and operation of the avionics system; and the quality and quantity of information presented to the pilot on the avionics displays. These issues are not surprising when the complexity of a FCS is considered in relation to the form and content of the information that is displayed to the flight crew.

For example, consider a Vertical Guidance Component (VGC) 100 of an FCS as shown in FIG. 1. The VGC 100 suitably maintains a selected vertical profile, for example, by adjusting the pitch of an elevator 102 and thrust of an engine 112 with control signals received from an autopilot 108 and autothrottle 118. The autothrottle 118 and autopilot 108 may receive manual instructions from the flight crew through the Mode Control Panel (MCP) 120.

Alternatively, the flight crew may opt to have a Flight Management System (FMS) 110 automatically select pitch modes, attitude targets, thrust modes and/or speed targets. The FMS 110 implements processes and decision-making algorithms which automate various tasks, such as control of pitch, roll, thrust mode selection (i.e., Vertical Navigation (VNAV)), altitude, heading, track, and speed target selection (i.e., FMS SPDS). The processes and decision-making algorithms utilize hundreds of rules and considerations relating to navigation, airspace regulations, aircraft operational limits, and the like, to select the appropriate modes and targets of flight. Once the FMS 110 has selected the appropriate control modes and targets of flight, display signals 122 representing the control signals transmitted to the autopilot and autothrottle are provided to a Flight Mode Annunciator (FMA) 300 of a primary flight display 114 for review by the flight crew.

The FMA 300 typically includes three panels: an autothrottle (speed) display panel 116, a roll autopilot display panel 118, and a pitch (altitude) autopilot display panel 120. Referring to FIG. 2, the autothrottle display panel 116 annunciates a speed target 302 and a speed control mode 304, the roll autopilot display panel 118 presents a heading/track target 306 and a heading/track control mode 308, and the altitude autothrottle display panel 120 provides an altitude target 310 and an altitude control mode 312. While these panels may be used by the pilot to determine the current behavior of the aircraft, a significant amount of interpretation remains to specifically identify the current objectives of the aircraft control system. This interpretation problem is exacerbated because some combinations of annunciations are not exclusive to particular modes of flight. For example, the annunciations PITCH and IDLE are used as the annunciation combination for no less than three separate aircraft behaviors. In addition, even after the pilot has interpreted the general behavior, behavior specifics may be unascertainable from the display.

To illustrate, if the pilot has determined the aircraft is in descent, no information is presented as to the purpose or objective of the descent, such as whether the aircraft is in EARLY DESCENT or LATE DESCENT. To determine the exact type of descent, the pilot typically accesses a performance page on a Control Display Unit (CDU) and monitors the path error information, which usually demands the pilot's attention for a substantial period of time.

Due to the large number of processes and algorithms used by VGCs 100, the limited number of targets and outputs displayed for the flight crew on conventional FMAs 300 within the user display interface 130, and the complexity and amount of information that is displayed in the cockpit in addition to the targets and outputs on FMA 300, the flight-crew can lose track of the VGC's 100 intentions and behavior (e.g. climb, cruise, descent, etc.). Furthermore, subtle differences in modes and mode transitions may go unnoticed by the flight crew, the flight crew may incorrectly interpret the system's actions as being inconsistent with expected conduct (i.e. automation surprise), and less than optimal adjustments may be made by the flight crew based upon an incorrect understanding of the system operation.

SUMMARY OF THE INVENTION

A vehicle control system according to various aspects of the present invention presents a behavior annunciation system for displaying to a vehicle operator the overall travel behavior of a vehicle. The behavior annunciation system has a storage medium for storing various vehicle operational parameters. In addition, the behavior annunciation system has a storage medium for storing various vehicle behavior modes. The behavior annunciation system processes data from the vehicle operational parameters storage medium and the behavior mode storage medium to generate a behavior mode output. The behavior mode output is then displayed to the vehicle operator in a manner which describes the overall behavior of the vehicle.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF PREFERRED EMBODIMENTS

The ensuing descriptions are preferred exemplary embodiments only, and are not intended to limit the scope, applicability, or configuration of the invention in any way. Rather, the ensuing description provides a convenient illustration for implementing a preferred embodiment of the invention. Various changes may be made in the function and arrangement of elements described in the preferred embodiments without departing from the spirit and scope of the invention as set forth in the appended claims. In addition, while the following detailed description is directed to vertical guidance automation of an aircraft, the present invention may be applicable to other control, guidance, navigation, and flightplanning functions of an aircraft, as well as automated systems of land, sea, air and space vehicles.

Figure 1:
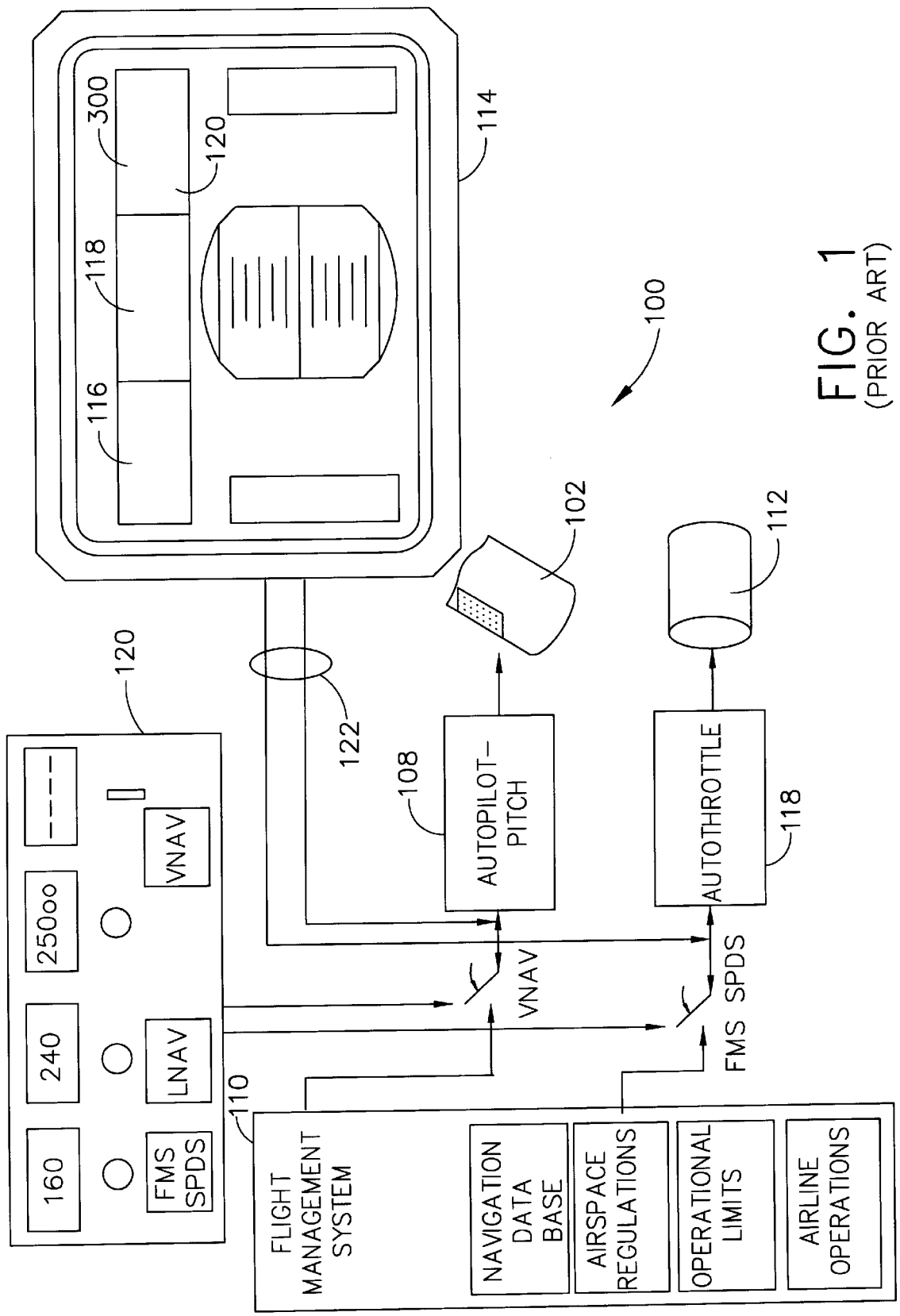
FIG. 1 is a diagram of a typical aircraft vertical axis guidance and control system.
Figure 2:
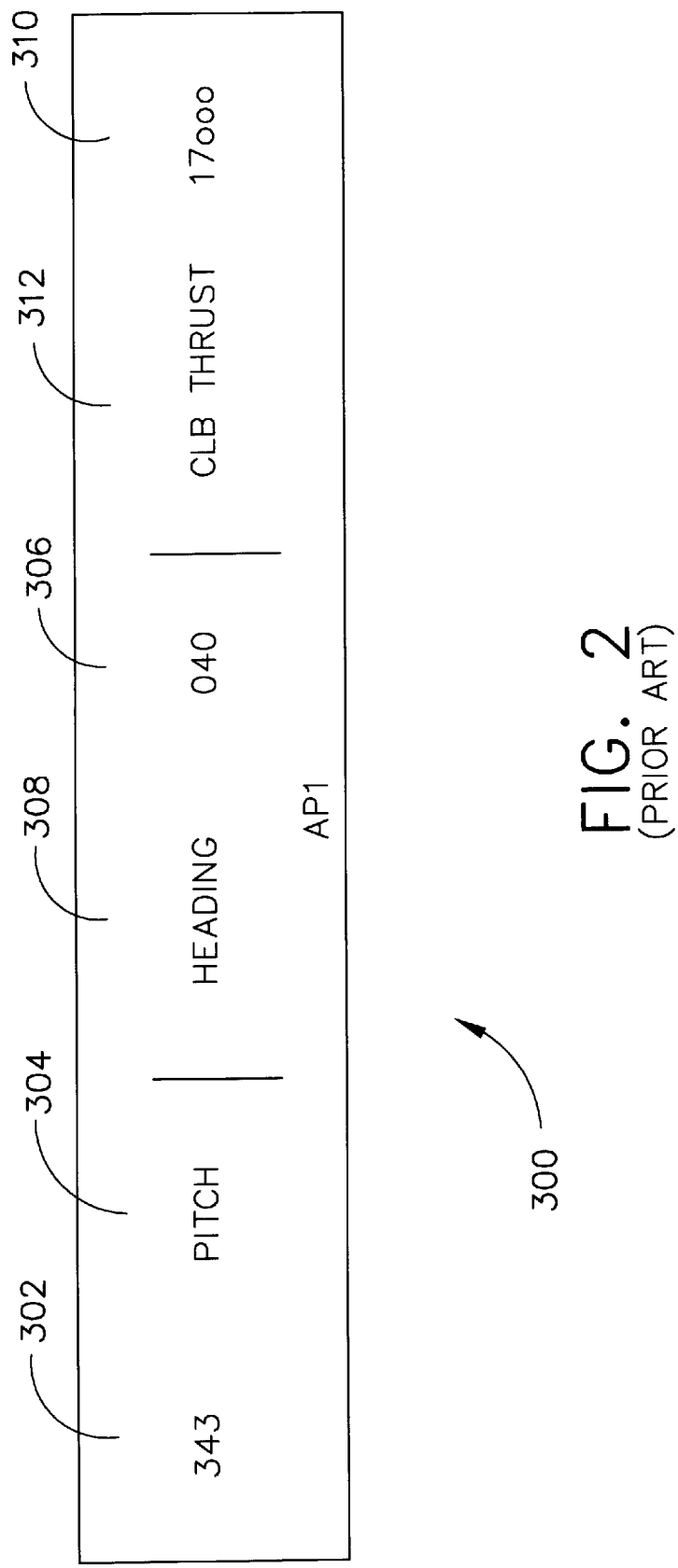
FIG. 2 is a diagram of an existing flight mode annunciator display.
Figure 3:
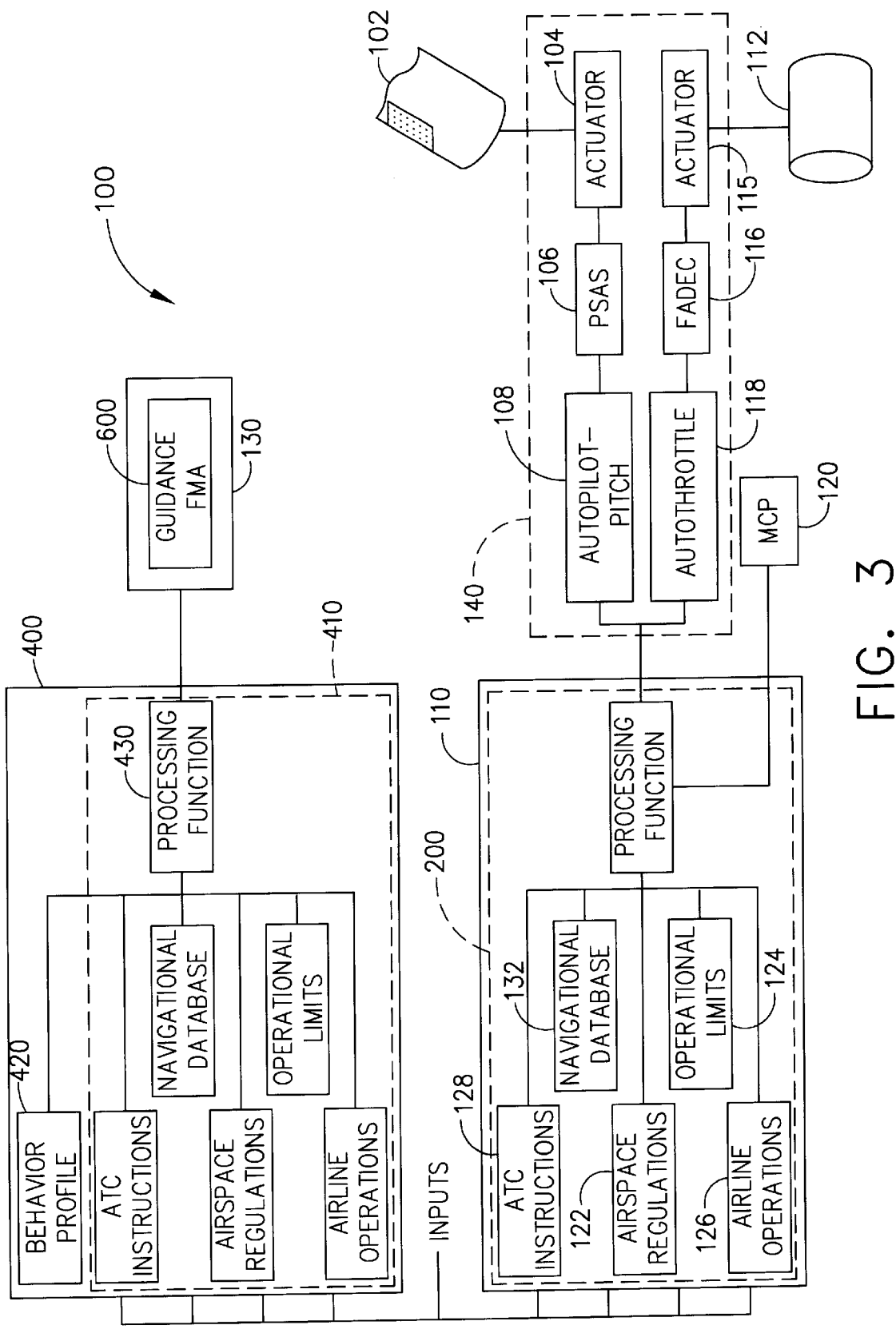
FIG. 3 is a block diagram of a preferred embodiment of an aircraft vertical axis guidance and control system with a flight mode annunciation function.

Referring to FIG. 3, a VGC 100 according to various aspects of the present invention includes: an FMS 110; a user input interface, such as a Mode Control Panel (MCP) 120; a user display interface, including an FMA 130; a set of navigational controls 140; and a behavior annunciation system 400.

The VGC 100 maintains a selected vertical profile by adjusting the pitch of an elevator 102 and thrust of an engine 112 via the navigational controls 140. The elevator 102 is electronically, mechanically, or hydraulically driven by an elevator actuator 104, which is in turn suitably driven by a Pitch Stability Augmentation System (PSAS) 106 that is receiving control signals from an autopilot 108. Similarly, the thrust of the engine 112 is electrically, mechanically, or hydraulically driven by an engine actuator 115 which is in turn, suitably driven by a Full Authority Digital Electronic Controller (FADEC) 116 that is receiving control signals from an autothrottle 118. The autothrottle 118 and autopilot 108 may receive manual instructions from the flight crew through the MCP 120, or alternatively, the flight crew may opt to have the FMS 110 automatically select pitch modes, attitude targets, thrust modes and/or speed targets.

The FMS 110 embodies a set of processes and decision-making algorithms which automate various tasks, typically including pitch, roll, thrust mode selection (i.e., VNAV), altitude, heading, track, and speed target selection (i.e., VNAV or Prof, and FMS SPDS). In addition, the FMS 110 embodies a storage medium 200 for storing various operational parameters, including, among others a navigation database 132, an airspace regulations database 122 having rules pertaining to airspace regulations, an operational limits database 124 of aircraft operational limits, an airline operations database 126 of airline operation rules, and an ATC database 128 having rules for interpreting air traffic control instructions to select the appropriate modes and targets of flight. Generally, the databases 122, 124, 126, 128, 132 of the FMS 110 cumulatively have hundreds of rules and considerations that are utilized in VNAV and FMS SPDS mode selection.

Behavior annunciation system 400 suitably receives the same inputs as the FMS 110. In the present embodiment, the behavior annunciation system 400 conducts a shadow process 410 substantially identical to that executed by the FMS 110 to generate vertical profile intentions and describe behavior modes rather than control modes. Behavior modes may be textually displayed on a Guidance FMA 600 for flight crew evaluation with minimal effort and risk of misunderstanding. The behavior annunciation system 400 includes a storage medium for storing the various operation parameters i.e., all the databases, processes and decision-making algorithms of FMS 110, and, in addition includes a storage medium 420 for storing various vehicle behavior modes, i.e., a behavior profile algorithm database.

With continuing reference to FIG. 3, the FMS shadow processes 410 and behavior profile algorithms 420 receive the same inputs (e.g. current altitude, speed, pitch/thrust, etc.) as those entering the FMS 100. The shadow processes 410 and behavior algorithms 420 are accessed by a processing system 430 to determine an overall vertical intention of the aircraft, an altitude target, a CAS/Mach (speed) target, a vertical speed target, and an integrated pitch/thrust mode.

Figure 4:
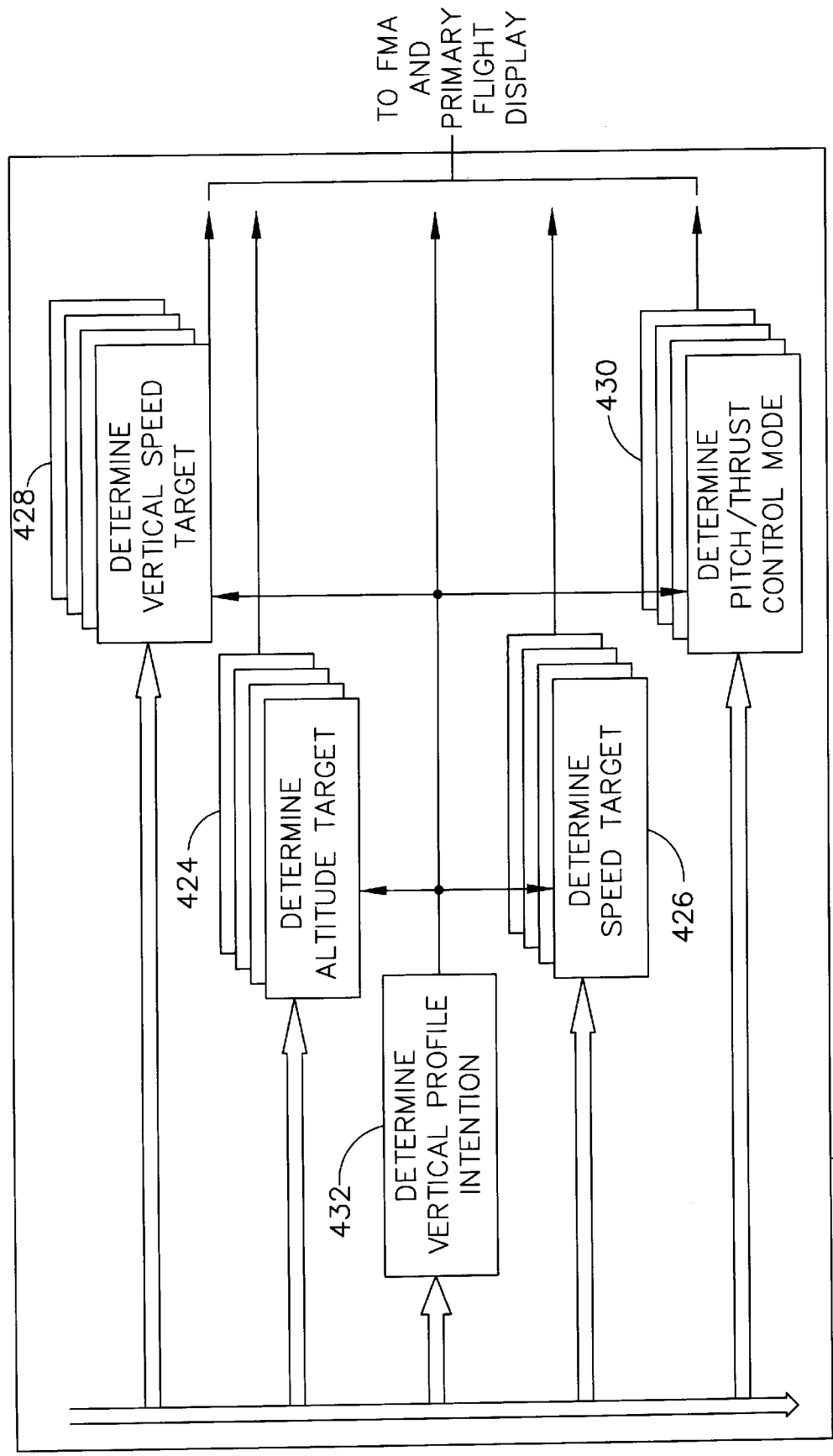
FIG. 4 is a process flow diagram of a flight mode annunciation function.

Referring now to FIG. 4, a preferred embodiment of behavior annunciation system 400 contains the behavior profile database 420 comprising a Vertical Profile Intention Process 432, an altitude target process 424, a speed target process 426, a vertical speed target process 428, and a pitch/thrust control mode process 434. Each process 422, 424, 426, 428, 434 is comprised of all necessary algorithms to describe every intention configuration of the aircraft. The intentions are typically created with the necessary operational procedures required by the Air Traffic Controller (ATC), international airspace regulations, and aircraft operational limits in order to manage the vertical profile and the lateral path. In addition, each intention for the vertical profile has an associated set of attributes. Typical attributes for determining the various behavior modes include: conditions for activation, altitude targets, speed targets, and integrated pitch/thrust control mode. The intentions and attributes can be programmed into the algorithms in essentially any suitable programming language, such as COBAL, BASIC, FORTRAN, C++, etc. In the preferred embodiment of the present invention, the algorithms for the intention and attributes may be expressed in pseudo-code. Appendix A lists and categorizes typical intentions and their attributes for various flight modes as they exist in the preferred embodiment; Appendix B shows examples of pseudo-code programming for the vertical profile intention, the altitude target, and the speed target.

As various aspects of the present invention apply to vehicle control systems in general, the particular intentions and their attributes may vary widely and could presumably apply to depth, keel, bank, acceleration, or any other vehicle profile. In addition, the order in which the various intentions/behavior algorithms and their respective attributes are performed may vary as well and are still within the scope of the invention.

Generally, the behavior algorithms 420 may be in the form of any logical steps. In the preferred embodiment, a series of "if-then" comparisons exist for each intention process 420 and its attributes (see Appendices A and B). Each set of algorithms can be continuously or intermittently compared to input data to determine which elements of each algorithm have been met. When all the elements of an algorithm have been met, the operation of the aircraft is assigned a behavior mode corresponding to the algorithm satisfied. The behavior mode is then displayed to the flight crew via the primary flight display 130.

With reference to Appendix B, each intention/target process is controlled by a set of algorithms which determine a behavior output. As described above, in the preferred embodiment, the algorithms typically operate in an "if-then" sequence. Generally, each behavior algorithm 420 performs a series of comparisons to determine what behavior mode the aircraft is in.

In the preferred embodiment of the present invention, the behavior annunciation system 400 first determines a vertical profile intention. Once the overall vertical intention is determined, the behavior annunciation system 400 uses the vertical intention to determine the altitude target and its origin through the altitude target process 424, the speed target and its origin through the speed target process 426, the vertical speed target and its origin through the vertical speed target process 428, and the pitch/thrust control mode and its origin through the pitch/thrust control mode process 430.

To illustrate, presume an aircraft is approaching an airport for landing. On commercial aircraft, the flight crew enters a descent approach path into the FMS 110. The path represents the optimum approach to the airport for landing and is otherwise known in the trade as following the "wire in the sky." If the aircraft is above the approach path, the aircraft runs the risk of passing the optimal landing area before touching down. Thus, in such a case, the FMS 110 signals the autopilot to bring the aircraft back to the path. Typically, this means increasing the speed of descent. In the preferred embodiment of the present invention, the vertical intention process considers the same inputs to the FMS 110 in conjunction with behavior annunciation system 400, and determines how the plane is operating in terms of a behavior or intention. Unlike conventional FMAs 300, it may not be immediately clear why the plane has increased the speed of its descent. The behavior annunciation system 400 indicates the behavior or intention to the flight crew in the primary flight display 130.

In this example, still referring to Appendix B, the vertical intention process 432 determines the aircraft is in LATE DESCENT mode if all of the following requirements are met: the aircraft is in PROF (profile mode) or VNAV; the aircraft is in either a descent or approach plan; all engines are operating properly; the aircraft is within standard approach path tolerances; either the aircraft is more than 250 feet above a pilot entered reference altitude, or within 250 feet above or below the reference altitude; the aircraft is not currently following the descent plan; the pilot entered reference altitude has changed; the aircraft is in either an altitude hold or altitude capture pitch mode; a descent plan has been entered; and the aircraft is not in an air traffic control ordered holding pattern. In the above example, if all the elements are satisfied, the primary flight display 130 annunciates LATE DESCENT in a the primary flight display 130. Thus, the flight crew is immediately informed of the reasons for the aircraft's increased vertical descent speed. If any element of the algorithm has not been met, the behavior annunciation system 400 continues to apply different algorithms corresponding to different behavior/intention modes until an intention can be designated.

In accordance with another aspect of the present invention, the output of the vertical intention process may be used to determine the altitude target and its origin, the speed target and its origin, the vertical speed target and its origin, and the pitch/thrust control mode and its origin. Again referring to the previous example and Appendix B, using the LATE DESCENT behavior designation in the altitude target process 424, the altitude target would be designated as CLEARANCE ALTITUDE if the following requirements are met: the vertical guidance intention is LATE DESCENT; the aircraft is in PROF mode; the approach of the aircraft is of a non-precision designation; the aircraft is not currently following the descent plan; there is no confirmed descent altitude; the aircraft is in a level approach segment of the flight plan; the aircraft is above the missed approach point altitude; and the aircraft is above the highest downpath descent altitude constraint. Assuming these criteria are met, CLEARANCE ALTITUDE behavior mode is communicated to the flight crew along with the actual altitude value on the primary flight display 130 in an altitude target area 620 of a Guidance FMA 600. Similarly, the behavior function 400 proceeds in the same fashion with respect to vertical speed target process 428 and the pitch/thrust control process 430.

The present invention thus suitably provides two or more modes (such as PITCH and IDLE) which give information about how the aircraft is being controlled. The behavior annunciation system 400 describes the overall behavior of the aircraft. The behavior names simplify the vertical guidance logic by performing the transformation from control mode information to the behavior mode automatically and then displaying the interpreted data to the flight crew. Generally, under normal operations, the overall vertical behavior name and other profile behaviors fall into one of the intentions described in Appendix A.

Figure 5:
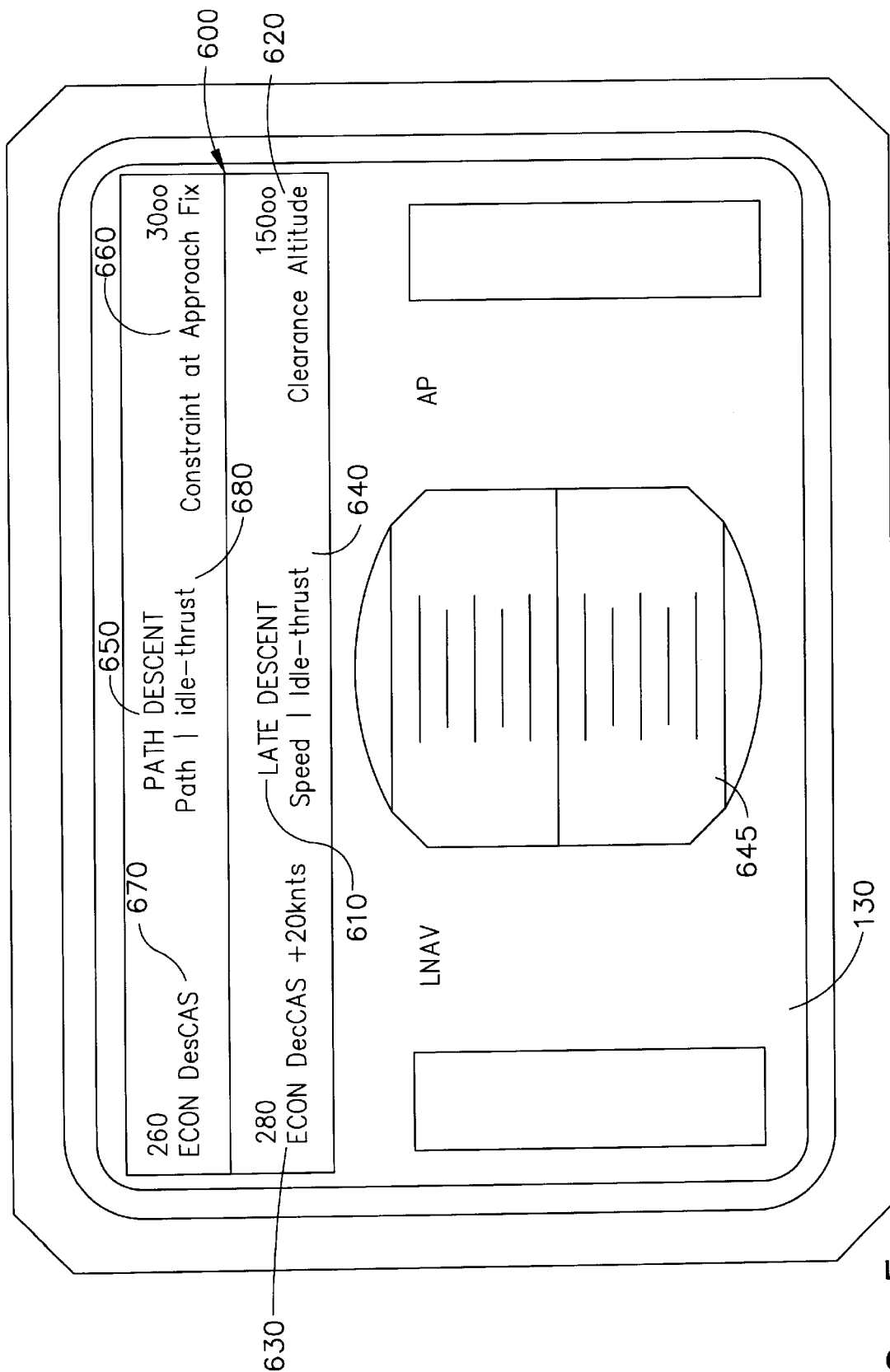
FIG. 5 is a diagram of a primary flight display with a Guidance Flight Mode Annunciator.

Referring now to FIG. 5, the user display interface 130 may comprise a console, cluster of gauges, display, or any other apparatus for communicating information to a vehicle operator. In the preferred embodiment of the present invention, a primary flight display 130 is employed. The primary flight display 130 may be an LCD, CRT, holographic projection, or any other apparatus for displaying visual information. The primary flight display 130 is part of the user-interface between the flight-crew, FMS 110, and behavior annunciation function 400 and is integral to vehicle management in aircraft and other vehicles so that the operator can interpret how the vehicle is operating. On aircraft, the primary flight display 130 is an interface between the aircraft and pilot, communicating to the pilot how the aircraft is currently operating. The primary flight display 130 and similar interfaces on other vehicles can contain a large amount of information. Existing displays 130 may contain up to and over 50 different areas of information, including areas for an attitude and roll indicator, a speed tape, an altitude tape, and FMA 300.

With continuing reference to FIG. 5, in the preferred embodiment of the present invention, the outputs of the processes 410, 420 described above are displayed in the Guidance FMA 600 of the primary flight display 130. A current vertical profile intention is displayed in a current Vertical Profile Intention text area 610. A current altitude target and its origin is displayed in a current altitude target text area 620. A current speed target and its origin is displayed in a current speed target text area 630. A current pitch/thrust control mode and its origin is displayed in a current pitch/thrust control mode text area 640. In addition, a next future vertical profile intention is displayed in a next Vertical Profile Intention text area 650. A next future altitude target and its origin is displayed in a future altitude target text area 660. A next future speed target and its origin is displayed in a future speed target text area 670. A next future pitch/thrust control mode and its origin is displayed in a next pitch/thrust control mode text area 680.

Guidance FMA 600 allows the pilot to merely view Guidance FMA 600 to determine what mode of operation of the aircraft; no interpretation of the specific control modes is necessary. Further, the behavior annunciation system 400 and Guidance FMA 600 assists pilots in predicting the next vertical mode because of generally accepted sequences of events occurring during normal flight. For example, pilots are aware that CLIMB generally precedes CRUISE or CLIMB INTERMEDIATE LEVEL. CLIMB INTERMEDIATE LEVEL similarly often precedes CLIMB once the aircraft receives clearance to proceed to a higher altitude.

An example of a typical occurrence during a normal flight illustrates the difference between the existing FMA's 300 and Guidance FMA 600. A common automation surprise occurs when a pilot experiences an unexpected level-off.

During the typical flight planning task, a crew member enters a flight plan including the instruction to fly at a flight level "at or below" 14,000 feet altitude constraint at waypoint ABC, 60 nautical miles from the airport. An "at or below" destination means that the aircraft must cross the specified waypoint (ABC) at a maximum altitude of 14,000 feet. In this example, presume the aircraft was lightly loaded, and it reaches 14,000 feet well before waypoint ABC. When passing through 12,000 feet, the aircraft is cleared to proceed to a cruise altitude of 33,000 feet. In this case, as the aircraft is in full automatic control, the pilot enters into the altitude window of MCP 120 to proceed to the new cruise altitude (33,000 feet), but does not remove the unwanted altitude restriction at ABC. Shortly thereafter the aircraft begins to level off at 14,000 feet. A pilot may be surprised when, though the pilot has clearance to climb and has entered the new altitude into MCP 120, the aircraft levels off at an altitude short of that which is desired. The pilot expects the aircraft to continue climbing, but the aircraft is limited by the initial 14,000 feet restriction.

The Guidance FMA 600 provides more information about the mission to the pilot. In the situation above, the Guidance FMA 600 indicates that the aircraft is climbing in current Vertical Profile Intention text area 610. The next annunciation is CLIMB INTERMEDIATE LEVEL, displayed in next Vertical Profile Intention text area. With the Guidance FMA 600, the pilot may establish the behavior of the aircraft, in addition to the specific mode of control. Such annunciation helps pilots better understand the reasons an aircraft is performing as it is.

Thus, the present invention determines the operational behavior of VCS 100 in the form of an overall intention or behavior and makes this information available to the operator of the vehicle. In the preferred embodiment of the present invention, the rules for the vertical profile and lateral path of aircraft are effectively standardized and the implementation of these rules is automated to enable increased complexity in the system, thus reducing pilot error and surprise and increasing the overall efficiency, safety and precision of aircraft flight.

While the principles of the invention have been described in illustrative embodiments, there will be immediately obvious to those skilled in the art, many modifications of structure, arrangements, proportions, the elements, materials and components, used in the practice of the invention which are particularly adapted for a specific environment and operating requirements without departing from those principles.

APPENDIX A

Intentions for Vertical Profile:

Climb
Climb Intermediate Level
Cruise
Path Descent
Late Descent
Early Descent
Path Descent Overspeed
Hold to Manual Termination
Airmass Descent Altitude Targets For Vertical Profile:

Clearance Altitude
Flightplan Climb Altitude Constraint
Flightplan Descent Altitude Constraint
Cruise Flightlevel
Destination Altitude + 50 ft.
Destination Altitude Constraint
Descent Path Segment Altitude
Approach Below Path Level-off Altitude
Climb Conflict Altitude
Cruise Conflict Altitude
Descent Conflict Altitude
Descent Speed Limit Altitude
Minimum Descent Altitude
Engine-out Driftdown Safe Altitude
Engine-out Driftdown Conflict Altitude Speed Targets For Vertical Profile:

Econ Climb CAS
Econ Climb Mach
Econ Cruise Mach for each Cruise Flightlevel
Econ Step Climb CAS
Econ Descent Mach
Edit Climb CAS
Edit Climb Mach
Edit Cruise CAS
Edit Cruise Mach
Edit Descent CAS
Edit Descent Mach
Max Angle Climb CAS
Max Endurance CAS
Max Rate of Descent
Hold CAS
Takeoff Speed (V2 + 10 knots)
Engine-out Takeoff Speed (V2 + X knots)
Engine-out Safe Speed (V3)
Engine-out Driftdown Speed
Late Descent Decel Speed
Return to Path Speed
Approach Speed for each flap/slat Configuration
Landing Speed Vertical Speed Targets for Vertical Profile:

−750 fpm
½ Descent/Approach Path Flight Path Angle
MCP VS Window

Integrated Pitch/Thrust Control Modes:

Speed/Max-Thrust
Speed/Idle-Thrust
Altitude Hold/Speed
Altitude Capture/Speed
Vertical Speed/Speed
Path/Speed
Path/Idle-Thrust
Altitude Hold/Idle-Thrust
Altitude Capture/Idle-Thrust
Altitude Hold/Max-Thrust
Altitude Capture/Max-Thrust

APPENDIX B

```
Intentions:
IF
/* Aircraft is long of the descent/approach path level at the reference
altitude when the reference altitude is lowered */
(
        VG_Type = PROF AND
        Flightphase = (approach OR descent) AND
        Engine_Status = all_engines_operating AND
        Aircraft_Speed = within_path_tolerance AND
        Aircraft Altitude = (above_reference_alt_plus_250ft OR
within_plus_minus_250ft_of_reference Altitude) AND
        Aircraft_Altitude = above_distance_based_path_altitude AND
        Aircraft_Altitude = not_within_path_capture_region AND
        Reference_Altitude = has_changed AND
        Flight_Control_Pitch_Mode = (alt_hold OR alt_capture) AND
        Descent_Approach_Path = exists AND
        Active_Lateral_leg = not_HM
        )
                THEN VG_Intention := late_descent
END IF
Altitude Target
IF
/* Aircraft is long of the descent/approach path level at the reference
altitude when the reference altitude is lowered */
(
        VG_Intention = late_descent AND
        VG_Type = PROF AND
        Approach_Type = non_precision AND
        Aircraft_Altitude = not_within_capture_region_to_path AND
        Minimum_Descent_Altitude = not_confirmed AND
        Aircraft_Altitude = level_approach_segment AND
        Clearance_Altitude = above_missed_approach_point_altitude AND
        Clearance_Altitude =
above_highest_downpath_descent_altitude_contraint
        )
                THEN Altitude_Target := clearance_altitude
END IF
Speed Target:
IF
/* Pilot selected ECON speed mode and aircraft cannot satisfy descent
altitude constraint at ECON + 20 knots*/
(
        VG_Intention = late_descent AND
        Engine_out_Driftdown = not_in_progress AND
        Aircraft = not_within_
        Aircraft_Distance_to_Destination = not sequenced_start_of_approach
AND
        Descent_Approach_Path = exists AND
        FMS_Speed_Mode = pilot_selected_ECON
        )
                THEN Speed_Target := return_to_path
END IF
IF
/* Pilot selected EDIT speed mode and aircraft is above the EDIT CAS/MACH
cross-over altitude*/
(
        VG_Intention = late_descent AND
        Engine_out_Driftdown = not_in_progress AND
        Aircraft_Distance_to_Destination = not sequenced_start_of_approach
AND
        Descent_Approach_Path = exists AND
        FMS_Speed_Mode = pilot_selected_EDIT AND
        Aircraft_Altitude = above_EDIT_CAS_MACH_crossover_altitude
        )
                THEN Speed_Target := edit_mach
END IF
```

What is claimed is:

1. A behavior display system for communicating a vehicle behavior to an operator, comprising:

an aircraft operational tracking system configured to monitor a plurality of aircraft operational parameters and generate a plurality of operation signals based on said plurality of aircraft operational parameters;

a processor configured to receive said plurality of operation signals and generate an aircraft behavior mode output based on said plurality of operation signals by comparing at least one of said plurality of operation signals to at least one behavior mode data stored in a storage medium; and an interface coupled to said processor and configured to communicate said aircraft behavior mode output.

2. The behavior display system according to claim 1, wherein said storage medium includes at least one of a navigation database, an airspace regulations database, an aircraft operational limits database, an airline operations database, and an air traffic control database.

3. The behavior display system according to claim 1, wherein said processor is configured to generate said aircraft behavior mode output based upon at least one of an aircraft vertical profile intention process, an aircraft altitude target process, an aircraft speed target process, an aircraft vertical speed target process, an aircraft pitch control process, and an aircraft thrust control process.

4. The behavior display system according to claim 1, wherein said interface is a primary flight display.

5. The behavior display system according to claim 1, wherein said interface is a flight mode annunciator.

6. The behavior display system of claim 1, wherein said aircraft operational tracking system comprises a FMS.

7. The behavior display system of claim 6, wherein said aircraft operational tracking system includes a shadow FMS configured to emulate the operation of the FMS.

8. The behavior display system of claim 1, wherein said interface displays a behavior mode output corresponding to at least one of a vertical profile intention, an altitude target, a speed target, a pitch control mode, and a thrust control mode.

9. A method for annunciating the behavior of an aircraft, comprising the steps of:
   providing an aircraft behavior mode database;
   tracking a plurality of aircraft operational parameters indicative of a plurality of aircraft conditions;
   identifying a behavior mode of the aircraft according to said plurality of aircraft operational parameters by executing a comparison between said plurality of aircraft operational parameters and said aircraft behavior mode database; and
   displaying said behavior mode.

10. The method according to claim 9, further comprising the step of storing an aircraft behavior mode database.

11. The method according to claim 9, wherein said identifying step includes the step of producing at least one of a current behavior mode and a future behavior mode.

12. The method according to claim 9, wherein said identifying step includes the step of determining a vertical profile intention.

13. The method according to claim 9, wherein said identifying step includes the steps of:
   determining a vertical profile intention; and
   using said vertical profile intention to determine at least one of an altitude target, a speed target, a vertical speed target, a pitch target, and a thrust target.

14. The method of claim 9, wherein said displaying step includes displaying said behavior mode output on a flight mode annunciator.

15. The method of claim 9, wherein said displaying step includes displaying said behavior mode output on a primary flight display.

16. An interface for displaying a behavior mode of a vehicle, comprising:
   an input for receiving a behavior mode signal corresponding to a plurality of aircraft operational parameters, wherein said behavior mode signal is generated by executing a comparison between a plurality of aircraft operational parameters and an aircraft behavior mode database; and
   an annunciator coupled to said input, said annunciator configured to receive said behavior mode signal from said input and display said behavior mode based on said behavior mode signal.

17. The interface according to claim 16, wherein said annunciator is a primary flight display.

18. The interface according to claim 16, wherein said annunciator includes an area configured to display at least one of a current behavior mode and a future behavior mode.

19. The interface according to claim 16, wherein said annunciator includes an area configured to display said behavior mode corresponding to at least one of an aircraft vertical profile intention target, an aircraft altitude target, an aircraft speed target, an aircraft vertical speed target, an aircraft pitch control mode and, an aircraft thrust control mode.

* * * * *